United States Patent [19]

Nutting et al.

[11] Patent Number: 4,922,333
[45] Date of Patent: May 1, 1990

[54] VIDEO COPYING APPARATUS SPECTRALLY-RESPONSIVE TO SLIDES OR NEGATIVES

[75] Inventors: Thomas C. Nutting, Fairport; King A. Lucas, Spencerport; Andrew D. Arnold, Hilton, all of N.Y.

[73] Assignee: Eastman Kodak Company, Rochester, N.Y.

[21] Appl. No.: 284,647

[22] Filed: Dec. 15, 1988

[51] Int. Cl.⁵ ............................................. H04N 1/46
[52] U.S. Cl. ..................................... 358/78; 358/75; 358/42
[58] Field of Search ........................ 358/75, 78, 80, 54, 358/55, 42, 487

[56] References Cited

U.S. PATENT DOCUMENTS

| | | | |
|---|---|---|---|
| 2,545,957 | 3/1951 | Kell | 178/5.4 |
| 2,850,563 | 9/1958 | Gretener | 178/5.2 |
| 2,866,847 | 12/1958 | James | 178/5.4 |
| 3,506,775 | 4/1970 | McMann, Jr. | 178/5.2 |
| 3,529,080 | 9/1970 | Nassimbene | 178/5.4 |
| 3,654,385 | 4/1972 | Flagle | 178/5.4 SY |
| 3,715,473 | 2/1973 | Tan | 178/5.4 ST |
| 3,794,408 | 2/1974 | Ian et al. | 350/162 R |
| 4,368,484 | 1/1983 | Stemme et al. | 358/41 |
| 4,404,585 | 9/1983 | Hjortzberg | 358/41 |
| 4,491,864 | 1/1985 | Yamada | 358/80 |
| 4,518,988 | 5/1985 | Saitoh et al. | 358/75 |

FOREIGN PATENT DOCUMENTS 126597  11/1984  European Pat. Off. .

Primary Examiner—James J. Groody
Assistant Examiner—Robert M. Bauer
Attorney, Agent, or Firm—David M. Woods

[57] ABSTRACT

Video copying apparatus generates a color sequential video signal from originals having different spectral characteristics, such as photographic slides and negatives. The apparatus includes a color filter wheel with a plurality of color filters that are sequentially interposed into the optical path between a camera and the original. By providing separate red filters in the filter wheel, the spectral pass bands of the red filters can be matched to the separate and distinctive red spectral responses of a slide or a negative. The output color video signal is obtained from a progression of filtered image signals generated by the camera according to the type of original. In one embodiment, a succession of video fields including red image signals from both red filters is continuously applied to a framestore and the selection of the appropriate red signal is made by storing only the color video signals corresponding to the desired type of original.

22 Claims, 6 Drawing Sheets

VIDEO COPYING APPARATUS SPECTRALLY-RESPONSIVE TO SLIDES OR NEGATIVES

BACKGROUND OF THE INVENTION

Field of the Invention

This invention relates to a color video imaging system, and in particular to a color video system in which spectrally-distinct color information is sequentially imaged upon a single image sensing device.

Brief Description of the First Drawing

The prior art will be described in relation to FIG. 1, which illustrates the spectral response of a photographic slide and a photographic negative and helps to show conventional color filtration for either or both types of objects.

Description Relative to the Prior Art

Color video imaging systems, specifically color video cameras, require at least three independent color records, such as red, green and blue, for conversion of a color scene into a video signal. Field sequential color imaging systems, which are generally well known, use a single image sensing device for sequentially receiving the independent color information at a relatively high cycle rate. Such systems typically separate the overall color information into red, green and blue spectral regions before it reaches the image sensing device. The resulting sequential color signals are stored line-by-line and processed together to form a video signal for color recording, transmission, and the like.

Many sequential systems utilize color filter wheels with three color filter segments for separating the light from the scene into the three independent spectral regions. The color wheel is rotated at a relatively high rate so that each filter segment is sequentially moved into the optical path between the image sensing device and the scene. The image sensing device is electrically driven at a corresponding rate so that a stream of sequential color signals is produced for processing into a combined or composite color signal. A representative sequential system is shown in U.S. Pat. No. 4,404,585. This patent describes a three color wheel (red, green and blue filter segments) and a four color wheel (red, blue, yellow and cyan filter segments.). The four color wheel has a primary color followed two scans later by its complementary color so that chroma information is produced by adding and subtracting the resulting color signals.

The color characteristics of the filters in the color wheel are selected in conjunction with the spectral characteristics of the image sensing device to yield color signal components of such character as to be reproduced with the proper color quality at a receiver. In addition, as described in U.S. Pat. No. 3,506,775, the color characteristics are sometimes selected so that signal voltages of equal amplitude are obtained for the several color components when a camera is scanning a specified white object field. The nature of the object field is sometimes predetermined so that the filter segments can be tailored to the spectral response of the object. FIG. 1 illustrates the spectral response of two common static objects—a photographic slide and a photographic negative. Both slides and negatives generally have, as shown in FIG. 1, the same response in the blue and green spectral regions. The two objects, however, have markedly different responses in the red spectral region. This happens because a negative is printed under safelight illumination in a darkroom while a slide is processed in darkness. The negative is therefore virtually opaque—i.e., no response—in the safelight spectral region A while the slide is at least partly transmissive in this region.

European Patent Publication No. 126,597 describes a sequential video system for display of a static object, such as a photographic negative in the disc format. Although such film is only in a negative format, this publication supposes that the filter segments of the color wheel may be suited for use with negative film or with transparency film or with a combination of both. Having a color wheel for only one type of object is a problem, of course, for the other object, that is, when both slides and negatives are to be copied. Changing filter wheels is an obvious, albeit cumbersome, solution. The other option discussed in Publication No. 126,597, that of suiting the filter segments to a combination of both slides and negatives, is illustrated in FIG. 1 by the red response curve shown in broken line covering both objects. The problem then is that the red filter sensitivity takes in too much, desaturating the red and green hues in the case of negatives. This ordinarily requires, for quality results, extensive electronic correction (matrixing) later in the signal processing chain.

SUMMARY OF THE INVENTION

To accommodate the different spectral responses of different static objects, such as positive (e.g., a slide) and negative originals, it is desirable to operate the video imaging system according to the invention in relation to a plurality of spectral responses appropriate to the particular originals the system is designed to utilize. The video imaging system includes image sensing means responsive to image light from the original for producing a plurality of image signals, a signal processing section for generating a color video signal from the image signals, and color filter means comprising a plurality of color filters for modifying the image light, including one combination of filters with spectral characteristics appropriate for a first type of original and a second combination of filters with spectral characteristics appropriate for a second type of original. In response to an input mode signal identifying the type of original, the video imaging system generates a color video signal from image signals corresponding to the combination of filters appropriate for the original, be it slide or negative.

In the preferred embodiment, the color filter means is a color filter wheel for supporting the plurality of filters. The wheel is rotated so that the filters are sequentially positioned over the image sensor. The color filter wheel houses two red filters, a green and a blue filter. The filter combination suitable for a negative original includes the first red and the green and blue filters. The filter combination suitable for a slide original includes the second red, and the same green and blue filters. In operation, the image sensor provides a sequence of four color signals and the progression of these signals through the signal processing section is controlled so that the color video signal is processed from the combination of signals derived from the combination of filters appropriate to the identified type of input. For instance, the signal processing section may include a framestore and only the appropriate combination of signals is entered into the framestore.

BRIEF DESCRIPTION OF THE REMAINING DRAWINGS

The invention will be described in relation to the remaining drawings, in which.

DETAILED DESCRIPTION OF THE INVENTION

Figure 2:
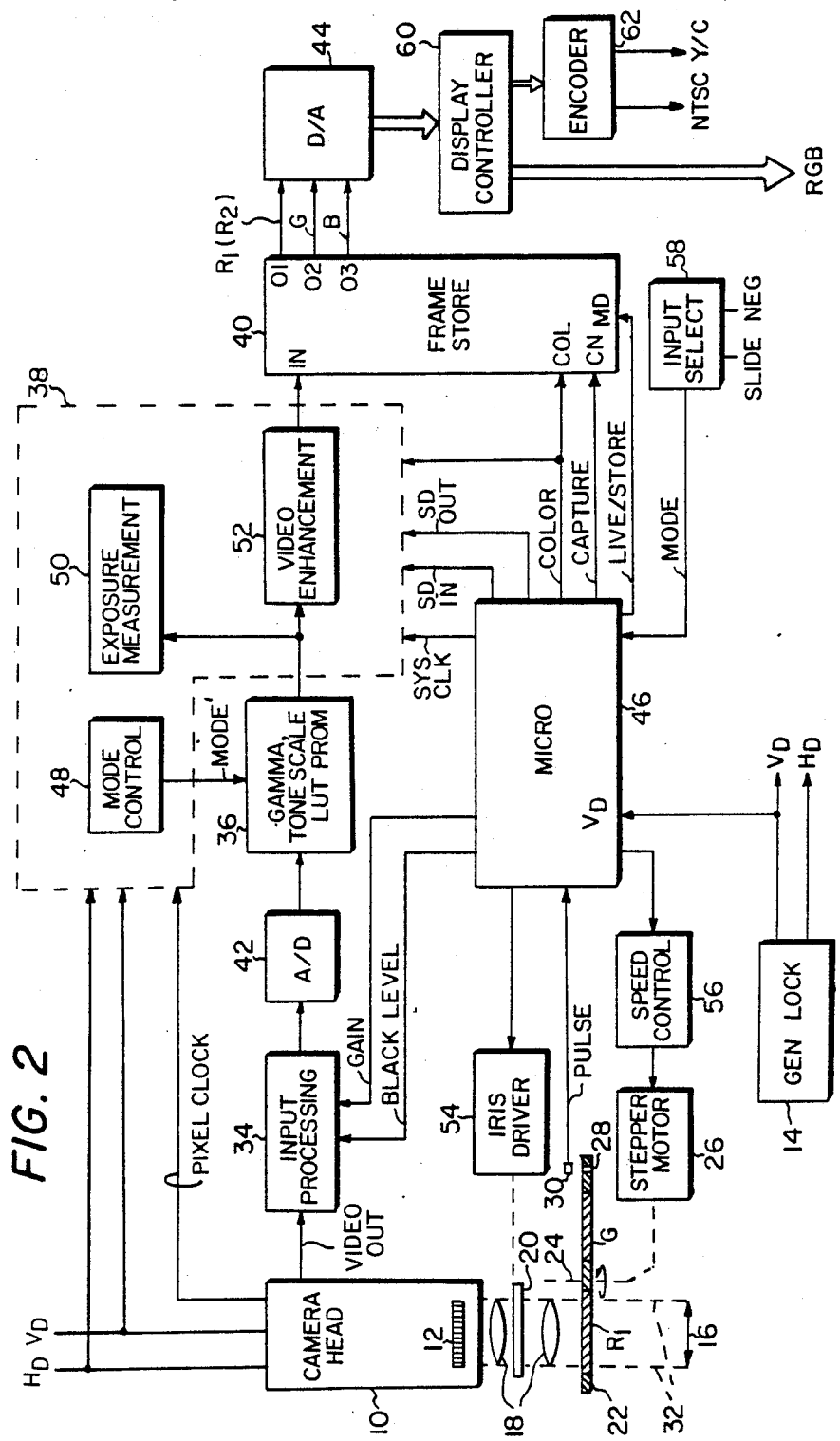
FIG. 2 is a block diagram of video copy apparatus for generating a field sequential video signal according to the invention from originals having two different spectral responses.

The video apparatus shown in FIG. 2 is sometimes referred to as a video transfer or copy stand, which includes a self-contained camera supported in spaced relationship with an illuminated platen on which a static original is placed. The camera is frequently mounted on an adjustable, telescoping support for movement toward and away from the original, and/or utilizing a zoom lens, as desired, for proper framing. Since the mechanical details of a transfer stand are well known, they will not be further addressed in this patent disclosure.

Figure 5:
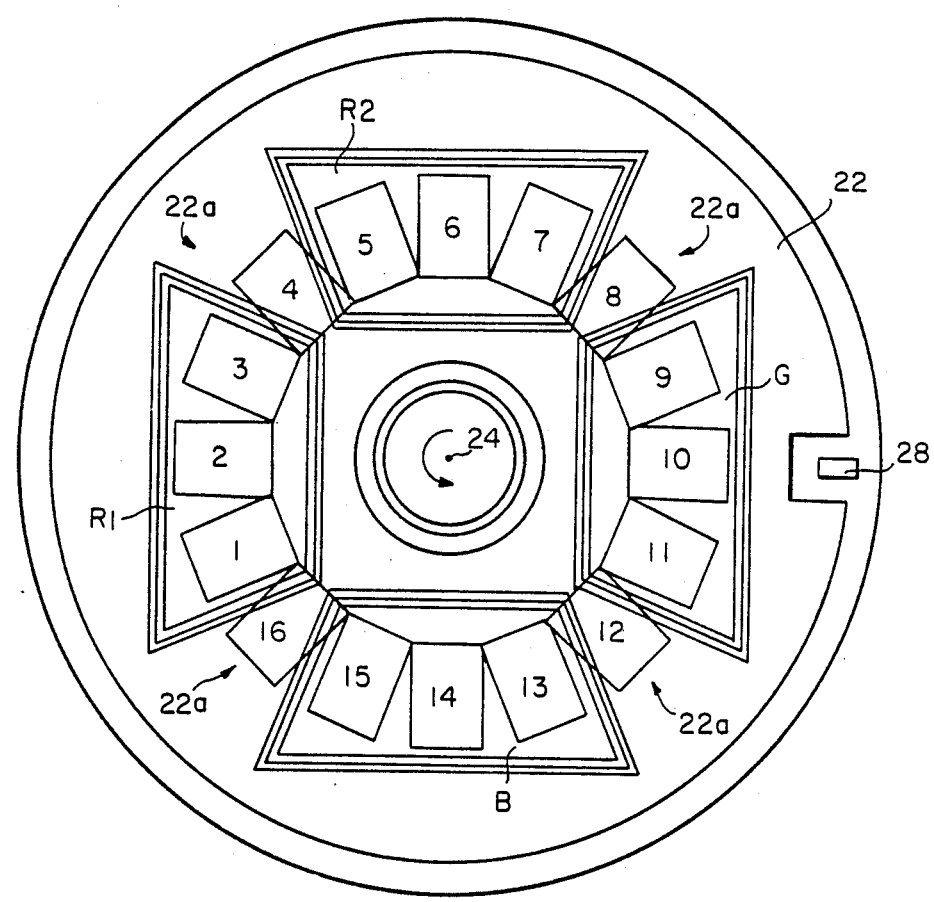
FIG. 5 is an additional plan view of the color filter wheel further projecting an outline of the image sensor in various locations to show the beginning and ending position of each field scan.

The preferred embodiment of the video copy apparatus shown in FIG. 5 employs a self-contained camera head 10. Although the selection of a particular camera head is not critical, a solid-state CCD camera manufactured by Cohu, Inc. (and referred to as a 4810 series camera) was used. The camera head 10 includes a frame transfer CCD image sensor 12 having an active imaging area of 754 horizontal by 488 vertical picture elements (pixels). The camera head 10 includes its own scanning system (not separately shown) for producing a video output signal. In addition, the camera head 10 produces a pixel clock signal and receives horizontal ($H_D$) and vertical ($V_D$) drive signals from an external source, such as the gen-lock circuit 14 shown in FIG. 2. (Gen-lock is a well-known method for locking the vertical and horizontal drive signals at their correct frequencies by means of digital techniques.) Other electrical connections are made to the camera head 10, but are not shown as they are unessential for describing the invention. The camera head 10 includes a C-mount adapter for accepting a variety of fixed focus and automatic lenses for focusing an image of a static original 16 upon the image sensor 12. A lens 18 is shown in FIG. 2, including an externally adjustable iris 20 for controlling the intensity of the image light striking the image sensor 12.

Figure 4:
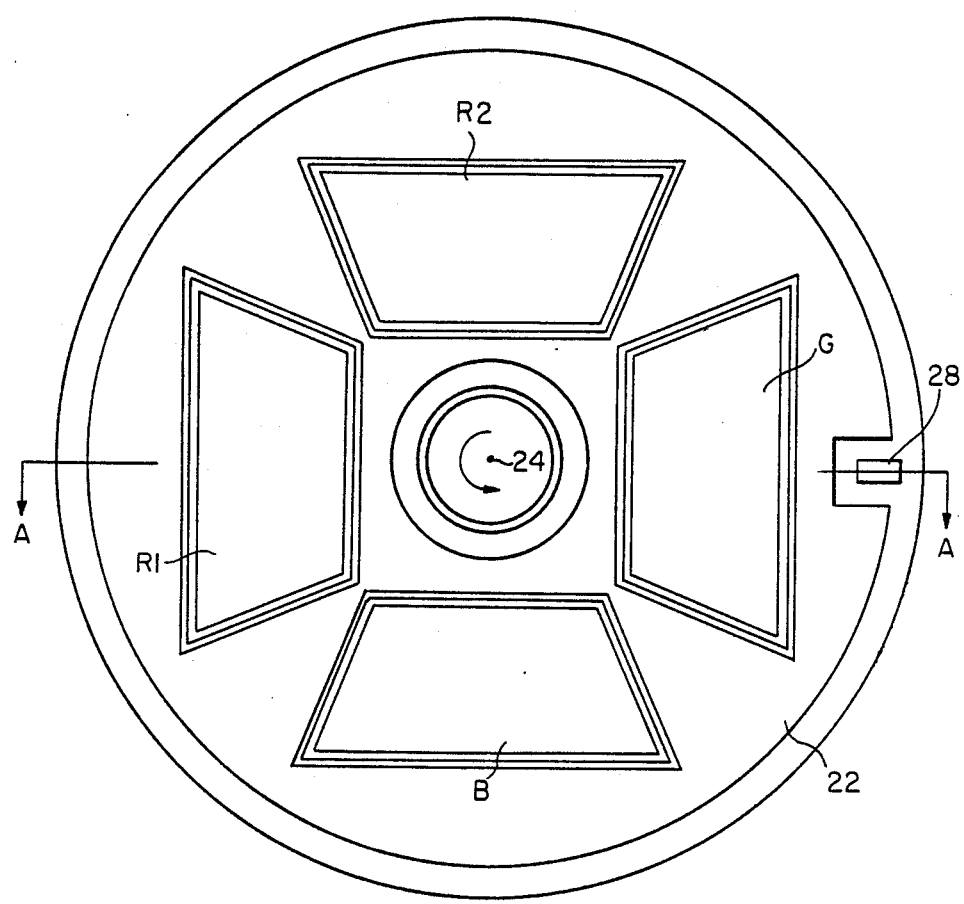
FIG. 4 is a plan view of a four segment color filter wheel used in the apparatus of FIG. 2.

A color filter wheel 22 is supported for rotation about an axis 24 by mechanical connection with a stepper motor 26. The color filter wheel 22 supports four filter segments, which are shown in the plan view of FIG. 4 to include a first red segment R1, a second red segment R2, a green segment G and a blue segment B. The filter wheel 22 is rotated at 3.75 revolutions per second; this, as will be shown later, corresponds to a field scan rate of 60 fields per second. FIG. 2 shows a cross-section of the color filter wheel 22 taken along the line A—A in FIG. 4, therefore showing the first red filter segment R1 and the green filter segment G. Both FIG. 4 and the cross sectional view show a synchronization index mark 28 at one edge of the color filter wheel 22. A photodetector 30 is mounted adjacent the color filter wheel 22 for detecting passage of the mark 28 as the wheel 22 rotates. A pulse signal is accordingly produced for each revolution of the wheel 22. The color filter wheel 22 is supported relative to an optical path delimited by the broken lines 32 such that the filter segments R1, R2, G, and B are sequentially interposed into the optical path 32 between the original 16 and the image sensor 12 as the wheel 22 is rotated. The occurrence of the pulse signal establishes a reference from which the identity of any filter segment interposed in the optical path is determined.

The principal parts of the signal processing section of the video copy apparatus include an input processing circuit 34, a look-up table 36 for gamma and tone scale correction, an application-specific integrated circuit (ASIC) 38 for controlling the look-up table 36, enhancing the video signal and making exposure measurements and adjustments, and a framestore 40 for storing selected color field components of the sequential video signal. Insofar as a large part of the signal processing is digital, an analog-to-digital converter 42 is connected between the input processing circuit 34 and the look-up table 36, and a digital-to-analog converter 44 is coupled to the output of the framestore 40. The use of the look-up table 36 allows for special gamma and tone scale corrections optimized for the particular type of original being copied.

A microprocessor 46 controls the signal processing section. More specifically, the microprocessor 46 sets the video gain and the black level of the video signal by connections to the input processing circuit 34. The integrated circuit 38, which includes a mode control circuit 48, an exposure measurement circuit 50, and a video enhancement circuit 52, communicates with the microprocessor 46 on a serial data input line ($SD_{in}$) and a serial data output line ($SD_{out}$). For instance, a particular gamma or tone scale correction is desirable for a particular type of original 16. A signal identifying the type of correction is applied to the circuit 38 on the serial data input line ($SD_{in}$) and transferred through a serial-to-parallel latch (not shown) connected to the mode control circuit 48. An appropriate control signal (MODE') is provided to the look-up table 36, which accordingly selects the look-up table(s) for the type of original 16. Likewise, certain image parameters (e.g., coring and gain levels) are latched from the serial data input line ($SD_{in}$) and used by the video enhancement circuit 52 during processing of the video signal. The exposure measurement circuit 50 measures, e.g., maximum, minimum and average brightness levels, which are transferred through respective parallel-to-serial latches (not shown) to the microprocessor 46 on the serial data output ($SD_{out}$) line. The timing of the respective data transfers is controlled by a system clock (SYS CLK) signal from the microprocessor 46 to the circuit 38.

The microprocessor 46 also controls an iris driver 54, which is connected to the external part of the iris 20, and a speed controller 56, which is connected to the stepper motor 26. An input select switch 58 provides a mode signal to the microprocessor 46 depending upon the type of object 16, that is, one condition of the mode signal indicates a positive original (such as a photographic slide) and another condition of the mode signal indicates a negative original. (The preferred embodiment is intended for processing photographic positive transparencies and negative transparencies, but the principle of the invention can be applied to any types of originals having different spectral characteristics.

The microprocessor 46 regulates the rotation speed of the color filter wheel 22 in relation to coincidence (or lack thereof) between the arrival of the pulse signal from the photodetector 30 and the vertical drive signal ($V_D$) from the gen lock circuit 14. From such coincidence, the microprocessor 46 controls the speed waveform generated by the speed controller 56. Based on such information and control, the microprocessor 46 determines which color filter segment is wholly within the optical path 32. As this information is useful elsewhere in the signal processing, the color segment identification is applied as a color signal to the integrated circuit 38 and to an input port COL of the framestore 40. Because the circuit 38 operates on discrete pixels, the pixel clock signal and the horizontal ($H_D$) and vertical ($V_D$) drive signals are also provided to the circuit 38.

The framestore 40 is enabled to store video signal according to the condition of a capture signal applied by the microprocessor 46 to a control port CN. Video field signals are applied to an input port IN of the framestore 40 and stored in the framestore whenever the capture line is pulsed high at the beginning of a field transmission. In this way, a selected combination of signal segments corresponding to the selected combination of filter segments is stored in the framestore 40. The framestore 40 is operated in two modes: a live mode and a store mode. In the live mode, which is used for set-up and framing of the original, a live output signal is continuously provided by continuously storing fields, and outputting fields, as they are provided to the framestore 40. In the store mode, which is used for the final copy image, the most recent set of fields is output. In either case the output is taken from the framestore 40 at video rates although the input to the framestore may be at some other (non-video) rate.

The video signals are input serially (through port IN) to the framestore 40 and output in parallel (though output ports 01, 02, 03) to the D/A converter 44. The analog red, green and blue output signals are applied in parallel to a display controller 60, which includes conventional manual controls for contrast, brightness, hue, saturation, white balance, sharpness and the like. The display controller 60 generates a RGB output signal both as a direct output of the video copy apparatus and as an input to an encoder circuit 62, which encodes the video signal and generates either a composite NTSC (or PAL, or SECAM, as the application requires) signal or a colorplexed Y/C (luminance, chrominance) signal.

The color filter segments $R_1$, $R_2$, B and G are specially sized to accommodate two consecutive fields of each color. This is better seen in FIG. 5, in which sixteen positions of the image sensor 12 are projected upon the color wheel 22 for one revolution thereof. In other words, the beginning position of each field scan is shown relative to the filter segments for each sixteenth of a revolution. One consequence of this arrangement is that, for an angular velocity of 3.75 revolutons per second, exactly 60 fields will be scanned in one second, which is the nominal video field rate. The diagram should also be understood to show that the beginning position of one field scan, e.g., field scan 1, is also the ending position of the previous field scan, e.g., field scan 16. From that observation, it should be clear that some field scans are wholly within the area of the filter segments $R_1$, $R_2$, G and B while other field scans are partially completed over the opaque areas 22a between filter segments. The latter scans contain useless video information and are discarded during signal processing.

For example, considering the first red filter segment $R_1$, field scans 1 and 2 are wholly within the red transmissive area of the filter segment and therefore receive valid video information—that is, the first scan starts at field scan 1 and ends at field scan 2, and the second scan starts at field scan 2 and ends at field scan 3. The next two scans, however, are only partly over the transmissive area of the filter segment and therefore receive partially useless video information—that is, the third field scan starts over the transmissive area at field scan 3 but ends over the opaque area 22a at field scan 4 while the fourth field scan starts over the opaque area 22a at field scan 4 and ends over the transmissive area shown as field scan 5. As this type of scan extends over a full revolution, it leads to a pattern of saving two fields, discarding two fields, saving two fields, discarding two fields . . . and so on.

Keeping the sequence of field utilization in mind, the operation of the video copy apparatus will be described in connection with FIG. 3. Two revolutions of the color filter wheel 22 are shown, as indicated by a twice repeated sequence of sixteen field scans. Boundaries are delimited by broken line above the field scan designations to show the approximate extent of the two red filter segments $R_1$ and $R_2$, the green filter segment G, and the blue filter segment B. A hypothetical situation is presented in which a slide is scanned during the first revolution and a negative is scanned during the second revolution—obviously, in actual practice, since the wheel 22 is spinning at 3.75 revolutions per second, there will be many hundreds of revolutions while one original is being lined up, framed, and copied, and the transition between types of originals will seldom correspond exactly to the transition between field 16 and field 1, as shown in FIG. 3.

Figure 1:
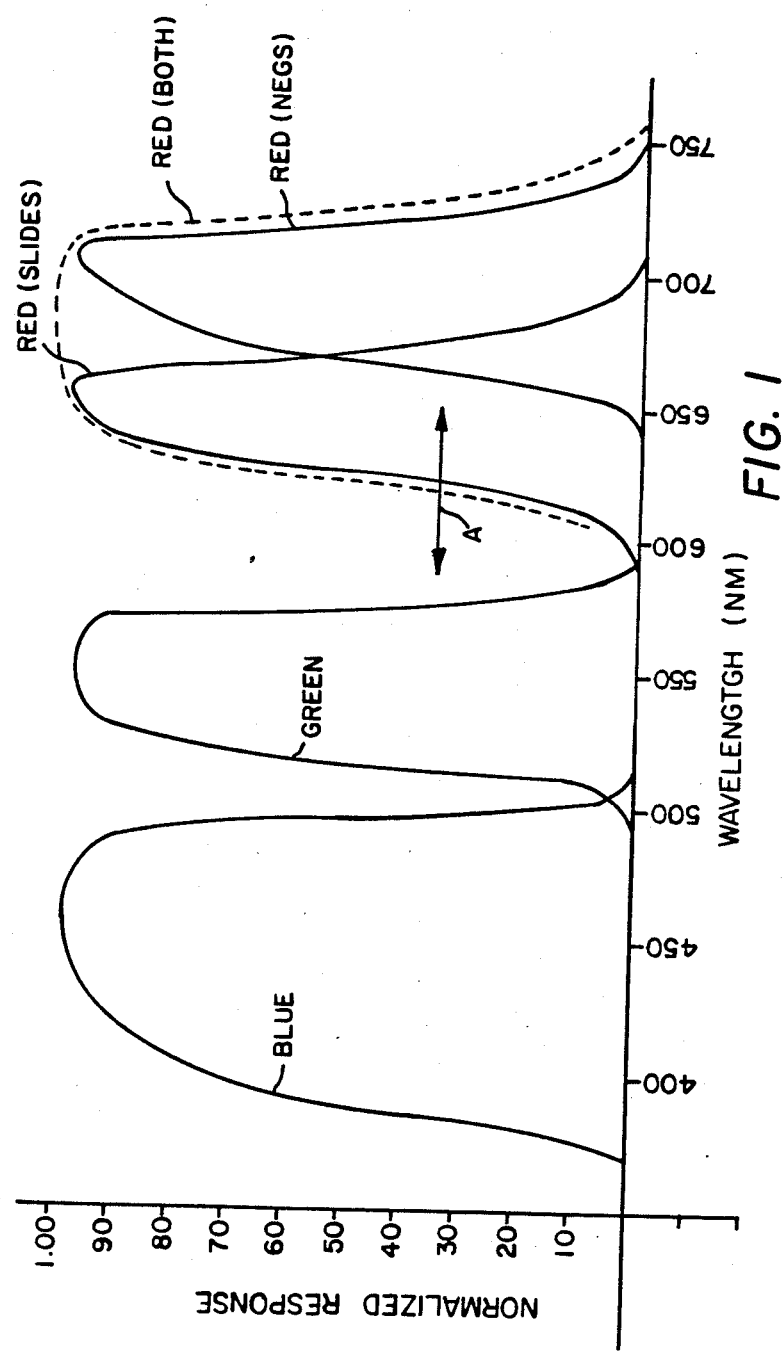

The mode signal from the input select switch 58 indicates the type of original. The switch 58 can be set by the user or it may result from automatic detection of either a slide holder or a negative holder in the system. The indication for a slide is the high condition of the mode signal; the indication for a negative is the low condition. The capture pulse provided to the control port CN of the framestore 40 determines which field scans are to be saved and, by the absence of pulses, which field scans are to be discarded. The main decision involves saving of the field scans corresponding to either the first red filter segment $R_1$ or the second red filter segment $R_2$. The first red filter segment has a transmissivity corresponding to the red response curve shown in FIG. 1 for slides; the second red filter segment has a transmissivity corresponding to the red response curve for negatives.

Figure 3:
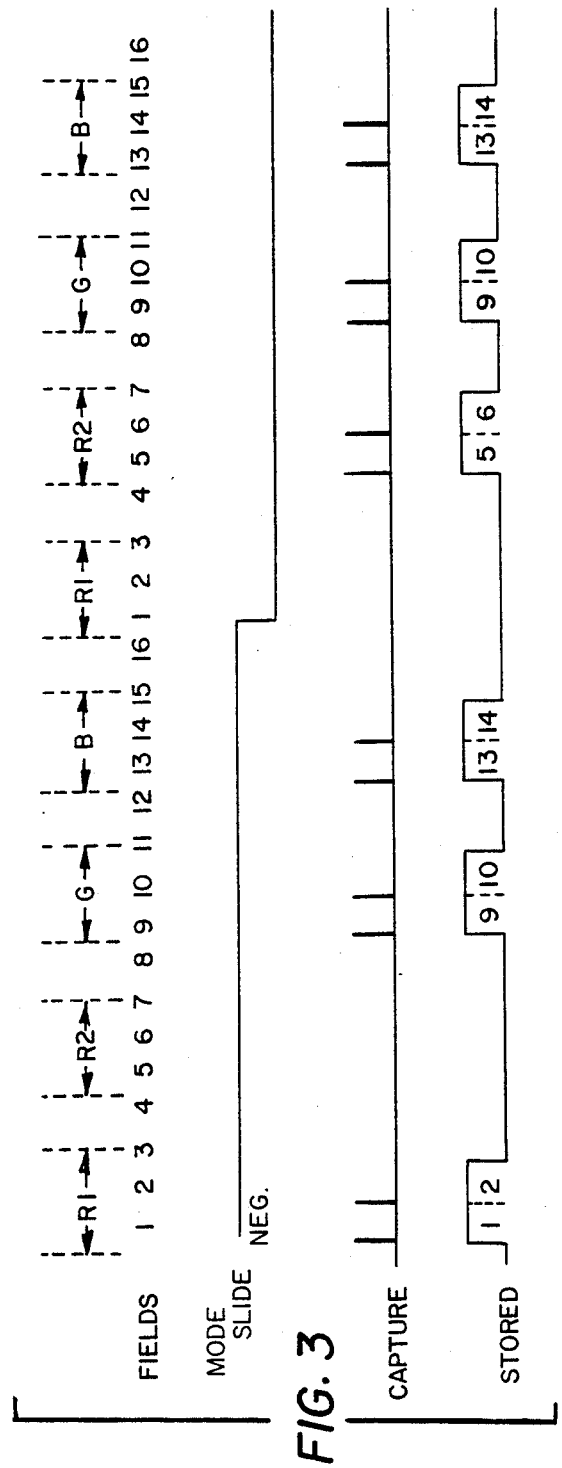
FIG. 3 is a diagram of several waveforms helpful in describing the operation of the video apparatus of FIG. 2.

The microcomputer 46 is programmed to provide the appropriate capture signals, as shown in FIG. 3, to the framestore 40 for storing either fields 1 and 2 from a slide original imaged through the filter segment $R_1$, or fields 5 and 6 from a negative original imaged through the filter segment $R_2$. In both cases, the same green fields 9 and 10 imaged through the filter segment G, and the blue fields 13 and 14 imaged through the filter segment B, are saved. FIG. 3 is also useful in showing that the capture pulses are timed to store the fields (1, 2, 5, 6, 9, 10, 13, 14) wholly imaged through the filter segments $R_1$, $R_2$, G and B while discarding the fields (3, 4, 7, 8, 11, 12, 15, 16) partially obstructed by the opaque portions 22a of the filter wheel 22. Color filters are well known and widely available in the art that have spectral passbands that at least closely approximate the spectral responses shown in FIG. 1 for either slides or negatives.

Figure 6:
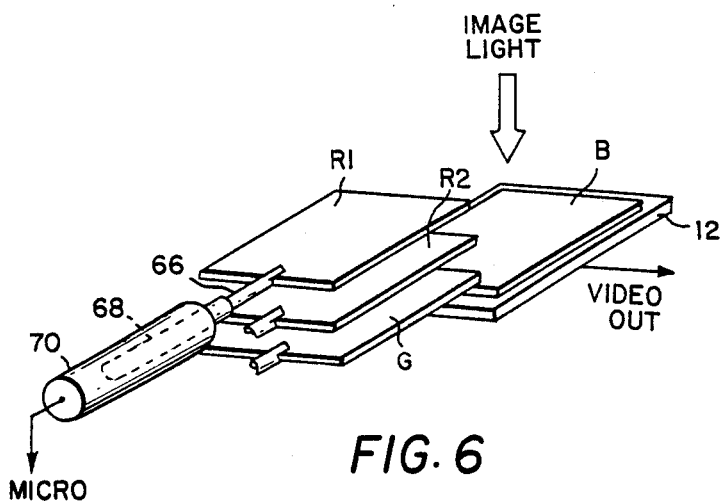
FIG. 6 shows another embodiment of color filters and an electromechanical filter operating mechanism useful with the apparatus of FIG. 2.

While the color filter segments are preferably supported for rotary motion on a color filter wheel, other mechanical forms of conveyance can be used to insert a selected filter segment into the optical path 32 between the image sensor 12 and the original 16. FIG. 6 illustrates such an alternative arrangement. Each color filter $R_1$, $R_2$, G and B is individually and separately movable from a position wholly outside the optical path to a position in the optical path, where image light from the original transmits through the filter and strikes the image sensor 12. In FIG. 6, the blue filter B is shown in the latter-mentioned position over the sensor 12. Each filter is moved by an electromechanical device; for instance, the red filter $R_1$ is shown attached by a rod 66 to the armature 68 of a solenoid 70. The solenoid 70 is activated at the appropriate time to move the red filter element $R_1$ into the optical path of the image sensor 12, and deactivated to move it out of the optical path. Though not shown, the other filters $R_2$, G and B would be similarly attached to additional solenoids.

The microprocessor 46 activates the respective solenoids in a predetermined sequence to shade the image sensor 12 with the appropriate combination of filters for the selected input mode thereby generating a sequential image signal for further processing according to the invention. The separate filters of FIG. 6 may be inserted into the optical path in a sequence similar to that described in connection with FIG. 2, that is, each solenoid 70 is operated in a predetermined, unchanging sequence and the separation of the correct color signals is made later in the signal processing chain. On the other hand, as shown by broken line in FIG. 6, the input mode selection could be interlocked with the solenoids 70 and only the correct color filters are inserted over the image sensor 12 for a given input mode. In that case, the selection of the color signals appropriate for the input mode (slide or negative) is made at the front end of the system by activating the correct combination of filters.

The embodiment of FIG. 6 is particularly useful with an image scanner of the type in which the image sensor 12 is a linear array with photosensitivity for one line. A typical scanner completely scans all lines in one color (by relative movement between the original and the linear array) before proceeding to the next color; thus each color filter is inserted over the linear array for the duration of a complete scan of the original. Depending on the nature of the original, one of the two red filters is used for that part of the scan. In an alternative configuration, each line scan is completed in all three colors before proceeding to the next line. In this case, the three color filters are sequentially inserted over the linear array for each line.

The invention has been described in detail with particular reference to a presently preferred embodiment, but it will be understood that variations and modifications can be effected within the spirit and scope of the invention. For instance, while the preferred embodiment has been described in connection with the NTSC television standard, it should be clear that the invention can be utilized with any other television standard by, e.g., appropriate modification of the line scan and the field rate. Although the preferred embodiment produces an analog output subsequent to digital processing, the invention is equally applicable in systems directly producing a digital output. The invention may be employed in applications other than typical video copying applications; in particular, the embodiment of FIG. 6 in the form of an image scanner can be used in a graphic arts application. In such an application, the output signal may not be a typical (NTSC, PAL, SECAM) video signal; the invention is nonetheless intended to extend to such apparatus.

What is claimed is:

1. Video apparatus for generating a color video signal from an image of an original, said apparatus comprising:
    means for generating an input mode signal separately identifying at least two different input modes corresponding to at least two types of originals having different spectral characteristics;
    video imaging means for generating a color video signal from the image of the original, said imaging means including image sensing means responsive to image light from the original for producing a plurality of image signals, a signal processing section for generating a color video signal from the image signals, and color filter means comprising a plurality of color filters for modifying the image light, including one combination of filters having spectral characteristics appropriate for the first type of original and a second combination of filters having spectral characteristics appropriate for the second type of original; and
    means responsive to the input mode signal for operating said video imaging means to generate a color video signal from image signals corresponding to the combination of filters appropriate for the identified input mode.

2. Video apparatus as claimed in claim 1 in which said color filter means comprises a color filter wheel for supporting said plurality of filters and means for rotating said filter wheel so that said filters are sequentially positioned over the image sensor so as to modify the image light from the original.

3. Video apparatus as claimed in claim 2 in which said combination of filters comprises, in said one combination, a first red, a first green and a first blue filter and, in said second combination, a second red and said first green and blue filters.

4. Video apparatus as claimed in claim 1 in which said means responsive to the input mode signal for operating said video imaging means controls the progression of image signals through said signal processing section so that the color video signal is processed from the combination of image signals corresponding to the combination of filters appropriate for the identified input mode.

5. Video apparatus as claimed in claim 1 in which said means responsive to the input mode signal for operating said video imaging means controls said color filter means so that only the combination of filters appropriate for the identified input mode modify the image light.

6. Video apparatus as claimed in claim 1 in which said color filter means comprises a set of discrete color filters supported in spaced relationship with the sensor and electromechanical drive means connected to respective color filters for inserting one or more color filters over the sensor so as to modify the image light from the original.

7. Video apparatus as claimed in claim 6 in which said means responsive to the input mode signal for operating said video imaging means controls said electromechanical drive means so that the combination of filters appropriate for the identified input mode are sequentially inserted over the sensor.

8. Video apparatus as claimed in claim 1 in which said image sensing means comprises an area array for concurrently imaging a plurality of lines of the original.

9. Video apparatus as claimed in claim 1 in which said image sensing means comprises a linear array for imaging a line of the original.

10. Electronic copying apparatus for generating a color signal from different types of originals, said copying apparatus comprising:
    an imager array for generating an image signal from an image of the original;
    means for supporting the original in the optical path of said imager array;
    means for generating an input mode signal separately identifying at least negative and positive input modes corresponding to negative and positive originals;
    color filter means comprising a plurality of color filters, including one combination of filters with spectral characteristics appropriate for negative originals and another combination of filters with spectral characteristics appropriate for positive originals;
    means for interposing said color filter means into the optical path between said imager array and said supporting means so that a sequential progression of filtered image signals is produced by said imager array; and
    means responsive to the input mode signal for generating a color signal from the filtered image signals provided by the combination of filters corresponding to the type of original.

11. Copying apparatus as claimed in claim 10 in which said color filter means comprises a color filter wheel for supporting said plurality of color filters and said means for interposing said color filters means into the optical path comprises a motor for rotating said color wheel so that the color filters are sequentially moved into the optical path between said imager array and said supporting means and a sequential progression of filtered image signals from both combinations of filters is produced.

12. Copying apparatus as claimed in claim 11 in which said means responsive to the input mode signal for generating a color signal generates said color signal by selecting the filtered image signals, from the sequential progression of filtered image signals, that were derived from the combination of filters appropriate for the identified input mode.

13. Copying apparatus as claimed in claim 12 in which said combinations of color filters comprises said one combination having a red filter with a passband tailored for positive originals and the other combination having a red filter with a passband tailored for negative originals.

14. Copying apparatus as claimed in claim 13 in which said two combinations of filters share the same blue and green filters.

15. Copying apparatus as claimed in claim 10 further comprising a framestore for processing said progression of filtered image signals and wherein said means responsive to the input mode signal for generating a color signal enables said framestore to receive and store only the subset of filtered image signals provided by the combination of filters corresponding to the type of original.

16. Copying apparatus as claimed in claim 10 in which said color filter means comprises a set of discrete color filters supported in spaced relationship with the imager array and electromechanical drive means connected to respective color filters for inserting one or more color filters over the imager array so as to modify the image light from the original.

17. Copying apparatus as claimed in claim 16 in which said means responsive to the input mode signal controls said electromechanical drive means so that the combination of filters appropriate for the identified input mode are sequentially inserted over the imager array.

18. Copying apparatus as claimed in claim 10 in which said imager array comprises an area array for concurrently imaging a plurality of lines of the original.

19. Copying apparatus as claimed in claim 10 in which said imager array comprises a linear array for imaging a line of the original.

20. Video copy apparatus for generating a video signal from an optical image of different types of originals, said apparatus comprising:
    a video camera having an image sensor arranged in relation to an optical path to receive the optical image of the original;
    means for supporting the original in the optical path;
    color filter means comprising a plurality of color filters optimized for at least two types of originals, including a combination of color filters having spectral characteristics optimized for a color negative original;
    means for moving said color filters into the optical path between the camera and the supporting means;
    means for signalling that the original is a color negative; and
    means responsive to said signalling means for generating a video signal in timed relationship to the movement of said combination of color filters into the optical path.

21. Video copy apparatus as claimed in claim 20 in which said color filter means is a color filter wheel and said means for sequentially moving said color filters into the optical path includes means for rotatably mounting said wheel in spaced relationship to said optical path so that each color filter is rotated in sequence into the optical path.

22. Video copying apparatus for generating a video signal from an original, said copying apparatus comprising:
    a video camera for viewing the original in relation to an optical path and for generating a camera signal;
    means for generating an input mode signal separately identifying at least negative and positive input modes corresponding to negative and positive originals;
    a color filter wheel supporting a plurality of color filters, including one combination of filters having spectral characteristics appropriate for a negative original and another combination of filters having spectral characteristics appropriate for a positive original;

means for rotating said color filter wheel so that said plurality of color filters are sequentially interposed into the optical path between the original and said camera, which consequently produces a progression of filtered camera signals;

a framestore for storing camera signals;

means responsive to the input mode signal for enabling the framestore to receive and store filtered camera signals corresponding to the combination of filters appropriate to the identified input mode; and means for generating a color video signal from the output of the framestore.

* * * * *